United States Patent
Yamahira

(10) Patent No.: US 8,787,056 B2
(45) Date of Patent: Jul. 22, 2014

(54) ELECTRIC POWER CONVERTER APPARATUS ENABLING REDUCTION OF TEMPERATURE DIFFERENCES AMONG A PLURALITY OF SEMICONDUCTOR MODULES OF THE APPARATUS

(75) Inventor: Yuu Yamahira, Kasugai (JP)

(73) Assignee: Denso Corporation, Kariya (JP)

( * ) Notice: Subject to any disclaimer, the term of this patent is extended or adjusted under 35 U.S.C. 154(b) by 1184 days.

(21) Appl. No.: 12/712,491

(22) Filed: Feb. 25, 2010

(65) Prior Publication Data

US 2010/0226158 A1 Sep. 9, 2010

(30) Foreign Application Priority Data

Mar. 6, 2009 (JP) ................................. 2009-053066

(51) Int. Cl.
*H05K 7/20* (2006.01)
(52) U.S. Cl.
USPC .......................................................... 363/141
(58) Field of Classification Search
USPC .................. 363/131–132, 141, 147, 144, 146
See application file for complete search history.

(56) References Cited

U.S. PATENT DOCUMENTS

| | | | | |
|---|---|---|---|---|
| 5,797,763 | A * | 8/1998 | Saka et al. .................... | 439/402 |
| 7,760,503 | B2 * | 7/2010 | Aoki et al. ................... | 361/699 |
| 7,881,086 | B2 * | 2/2011 | Nakayama et al. ........... | 363/144 |
| 2001/0042925 | A1 * | 11/2001 | Yamamoto et al. ........... | 257/784 |
| 2004/0145034 | A1 * | 7/2004 | Fujioka et al. ................ | 257/664 |
| 2005/0206487 | A1 * | 9/2005 | Honsberg-Riedl et al. ... | 336/178 |
| 2007/0159864 | A1 * | 7/2007 | Yoshizaki et al. ............. | 363/89 |
| 2008/0165301 | A1 * | 7/2008 | Chang et al. ................... | 349/40 |
| 2009/0008061 | A1 * | 1/2009 | Inagaki et al. ............... | 165/80.4 |
| 2009/0201708 | A1 * | 8/2009 | Ohkouchi et al. ............ | 363/132 |

FOREIGN PATENT DOCUMENTS

| | | |
|---|---|---|
| JP | 2002-044960 | 2/2002 |
| JP | 2007-006575 | 1/2007 |
| JP | 2007-116840 | 5/2007 |
| JP | 2007-266634 | 10/2007 |

OTHER PUBLICATIONS

Thermal Resistance. Merriam-Webster.com. Merriam-Webster, n.d. Web. Mar. 10, 2014. <http://www.merriam-webster.com/dictionary/thermal resistance>.*

* cited by examiner

*Primary Examiner* — Adolf Berhane
*Assistant Examiner* — Jeffrey Gblende
(74) *Attorney, Agent, or Firm* — Nixon & Vanderhye PC

(57) ABSTRACT

An electric power converter apparatus includes a plurality of semiconductor modules connected in parallel, with respective current-carrying electrode terminals of the modules being connected to a common branch point via connecting leads having respectively different values of impedance, such that the impedance values decrease in accordance with increased degrees of effectiveness of cooling the respective semiconductor modules, thereby reducing variations in operating temperature between the modules.

4 Claims, 7 Drawing Sheets

ELECTRIC POWER CONVERTER APPARATUS ENABLING REDUCTION OF TEMPERATURE DIFFERENCES AMONG A PLURALITY OF SEMICONDUCTOR MODULES OF THE APPARATUS

CROSS-REFERENCE TO RELATED APPLICATIONS

This application is based on and incorporates herein by reference Japanese Patent Application No. 2009-053066 filed on Mar. 6, 2009.

BACKGROUND OF THE INVENTION

1. Field of the Invention

The present invention relates to an electric power converter apparatus having a plurality of semiconductor modules (i.e., modules each containing a plurality of interconnected semiconductor devices), with some of the semiconductor modules being connected in parallel.

2. Description of Related Technology

Types of electric power converter apparatus such as converters and inverters are known, which convert electrical power (e.g., voltage conversion and/or DC-AC conversion) by switching operation of semiconductor elements. The required levels of current which must be switched by such an electric power converter apparatus are becoming increasingly higher. This may be achieved by configuring an electric power converter apparatus using pluralities of semiconductor modules connected in parallel. In the prior art, from considerations of operating efficiency, it has been attempted to form layout and shapes of the conductors (i.e., current-carrying conductors) which connect to electrode terminals within each semiconductor module of a plurality of parallel-connected modules, such as to achieve uniform levels of controlled current through each of the semiconductor modules. This is described for example in Japanese patent application publication No. 2002-44960 (referred to in the following as reference document 1).

However, for example in the case of an electric power converter apparatus formed of a plurality of semiconductor modules stacked as an elongated array of modules, cooled by means of cooling tubes disposed in contact with the semiconductor modules, with a coolant medium circulating through the cooling tubes, variations will occur in the cooling effectiveness of the various semiconductor modules in accordance with their respective positions (upstream or downstream with respect to the flow of coolant medium). These variations result from differences in temperature occurring within the coolant medium, pressure losses within the coolant medium, etc.

The term "thermal resistance" of a semiconductor module, as used in the following description and in the appended claims, is to be understood as used in the specific sense of "relative cooling effectiveness" achieved for the is semiconductor module. That is to say, for any specific level of electrical power dissipated as heat by a semiconductor module, the operating temperature of the module increases in accordance with the thermal resistance of the module.

Thus, when a plurality of semiconductor modules are successively stacked and are cooled as described above by cooling tubes, with the cooling tubes and semiconductor modules successively alternating along the stacking direction (so that each module is contacted on opposing sides by cooling tubes), with a coolant medium flowing from an input port into the cooling tubes and being discharged from an outlet port, the respective values of thermal resistance of the semiconductor modules will successively increase in accordance with increasing distance of the modules from the intake port, along the stacking direction of the modules (i.e., will successively increase from the upstream side to the downstream side of the coolant flow path). Temperature variations will thereby arise between the respective semiconductor modules. That is to say, there will be a bias towards successively increasing temperature values of the semiconductor modules, from the upstream side to the downstream side. Hence it is not possible to operate all of the semiconductor modules efficiently while ensuring that none of the modules have electrical characteristics adversely affected by excessively high operating temperature.

It is an objective of the present invention to overcome the above problem, by providing an electric power converter apparatus having a plurality of semiconductor modules whereby such a bias of temperature values of respective semiconductor modules can be prevented. More efficient operation of the electric power converter apparatus can thereby be achieved.

To achieve the above objective, according to a first aspect, the invention provides an electric power converter apparatus which includes at least one set of (plurality of) semiconductor modules which are connected in parallel. Each of the semiconductor modules comprises a plurality of electrode terminals (in general, two electrode terminals) for transferring a flow of electric current through the semiconductor module. Respectively corresponding ones of the electrode terminals of the semiconductor modules are electrically connected via corresponding connecting leads (referred to herein as branch conductor leads) to a common branch point.

The basic characterizing feature of the present invention is that corresponding branch conductor leads of the various semiconductor modules are configured with respectively different values of impedance, such that the impedance values successively increase in accordance with increased values of thermal resistance of the semiconductor modules.

In that way, temperature differences between the semiconductor modules can be reduced, since the level of current flow through a semiconductor module having a relatively high value of thermal resistance is correspondingly decreased (thereby reducing the electrical power dissipated within the semiconductor module), due to a relatively increased impedance of a connecting lead (or connecting leads) carrying current of the semiconductor module.

DESCRIPTION OF PREFERRED EMBODIMENTS

First Embodiment

Figure 1:
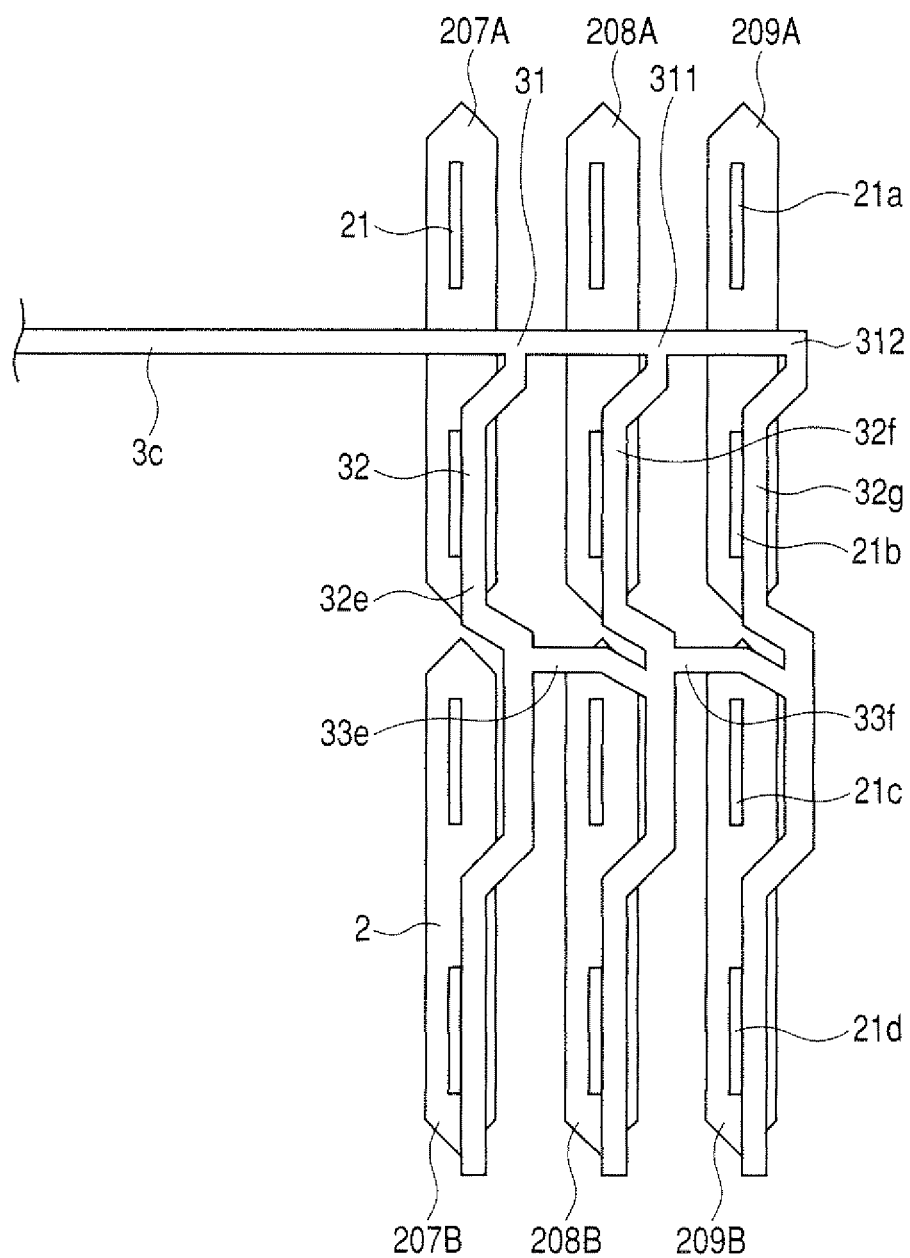
FIG. 1 is a diagram for describing the connection conditions between an intermediate busbar and semiconductor modules within a part of a first embodiment of an electric power converter apparatus.

An embodiment of an electric power converter apparatus, designated by reference numeral 1, will be described referring to FIGS. 1-5. As shown in the external plan view of FIG. 2, the electric power converter apparatus 1 is formed of 30 semiconductor modules, collectively designated by reference numeral 2, stacked as an elongated array of 15 stacked pairs of semiconductor modules (15 stages). More specifically, the semiconductor modules 2 consist of 15 positive-side semiconductor modules 201A to 215A, and 15 negative-side semiconductor modules 201B to 215B, arranged as 15 pairs (15 stages) each formed of a positive-side semiconductor module and a negative-side semiconductor module.

The electric power converter apparatus 1 is a combination of a voltage step-up converter (for step-up of the output from a low-voltage DC power source) which is implemented by six of the semiconductor modules (3 stages), and a power inverter (for converting the stepped-up voltage from the voltage step-up converter to an AC power voltage) which is implemented by the remaining 24 semiconductor modules (12 stages).

Figure 3:
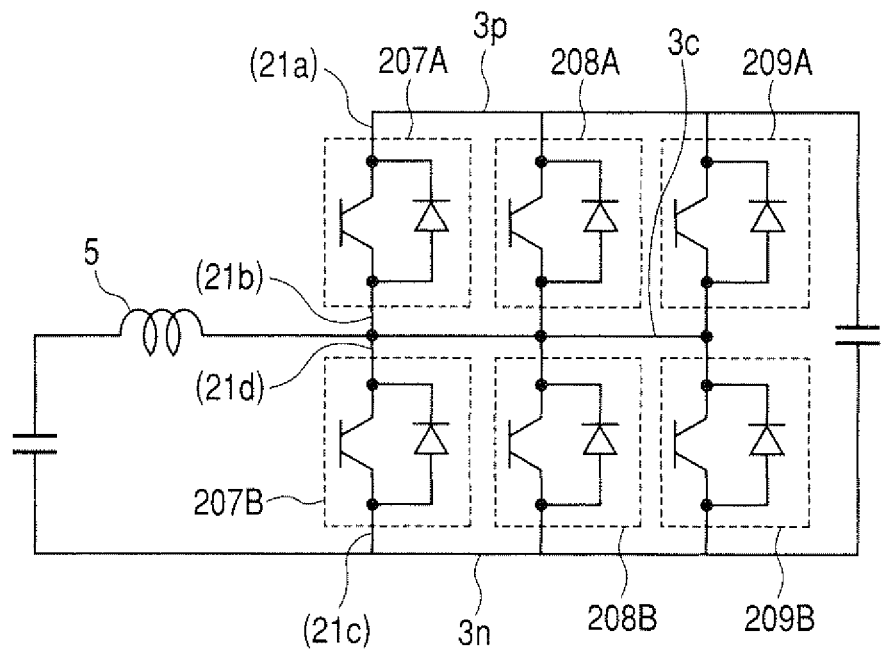
FIG. 3 is a partial circuit diagram of the first embodiment.

The circuit diagram of the voltage step-up converter is shown in FIG. 3. This is formed of three positive-side semiconductor modules (207A, 208A, 209A) connected in parallel, and three negative-side semiconductor modules (207A, 208A, 209A) connected in parallel, with each semiconductor module containing a semiconductor switching element and a diode connected in parallel. The positive-side semiconductor modules 2 are connected between a positive-polarity busbar 3p and a intermediate busbar 3c, while the negative-side semiconductor modules 2 are connected between a negative-polarity busbar 3n and the intermediate busbar 3c. The intermediate busbar 3c is connected via an inductor 5 to the low-voltage DC power source. The positive-polarity busbar 3p is connected to the positive-polarity output (high) voltage of the step-up converter, while the negative-polarity busbar 3n is connected to the negative side of the input and output voltages. The parallel-connected positive-polarity semiconductor modules 2 are connected in series with the parallel-connected negative-polarity semiconductor modules 2.

Figure 4:
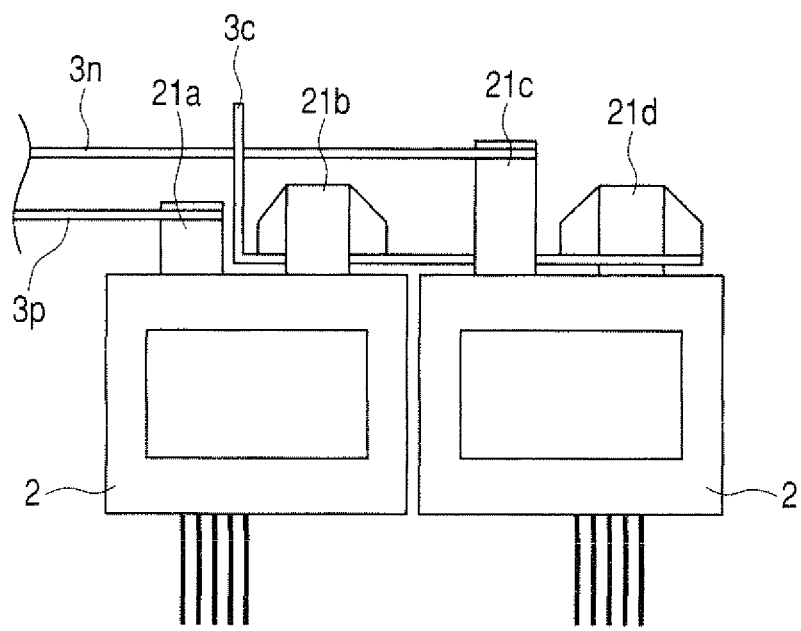
FIG. 4 is a front view of the embodiment showing the connection conditions between semiconductor modules and the intermediate busbar, a positive-polarity busbar, and a negative-polarity busbar.

As shown in FIG. 4, each negative-side semiconductor module such as the module 207B is connected via an electrode terminal 21c to the negative-polarity busbar 3n while each positive-side semiconductor module such as the module 207A is connected via an electrode terminal 21a to the positive-polarity busbar 3p. In addition, each negative-side semiconductor module (207B, 208B, 209B) of the voltage step-up converter is connected via an electrode terminal 21d to the intermediate busbar 3c, while each positive-side semiconductor module (207A, 208A, 209A) of the voltage step-up converter is connected via an electrode terminal 21b to the intermediate busbar 3c.

The term "electrode terminal" of a semiconductor module, as used in this description and in the appended claims, is to be understood as referring a terminal which transfers a flow of current through the semiconductor module (as opposed to a control terminal).

Step-up of the low DC voltage is achieved by switching operation of the semiconductor modules 2. The output AC voltage produced by the power inverter of the electric power converter apparatus 1 is connected to one of the (U, V, or W) power supply terminals of a 3-phase AC motor. If the motor becomes driven to function as an AC power source instead of a load, the electric power converter apparatus 1 performs voltage step-down operation, i.e., regeneration operation.

Figure 2:
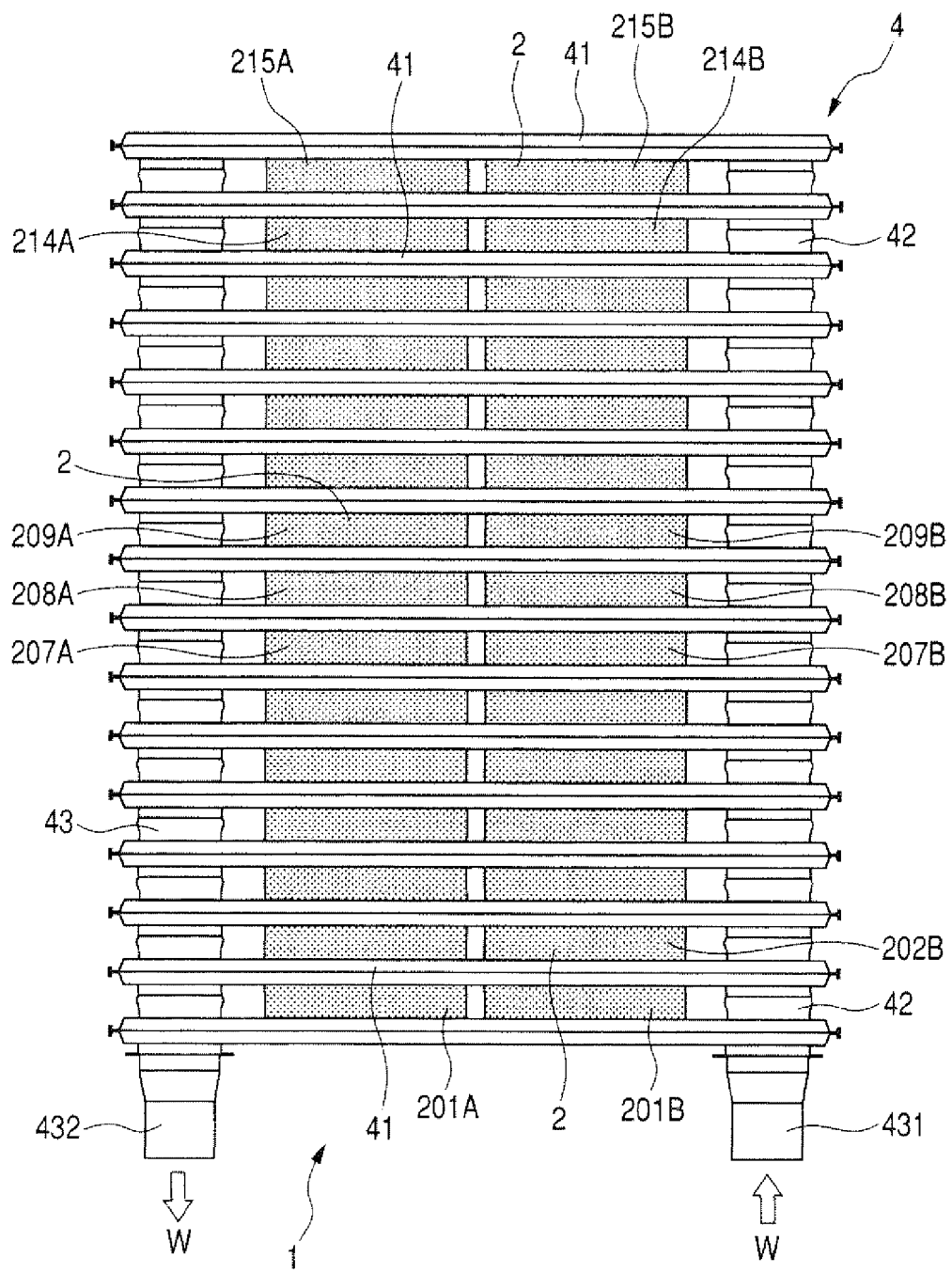
FIG. 2 is a plan view of the first embodiment.

The 12 stages constituting the power inverter of the electric power converter apparatus 1 consist of 12 positive side semiconductor modules connected in parallel, and 12 negative side semiconductor modules connected in parallel. Each of the positive side semiconductor modules has an electrode terminal connected to the busbar 3p, while each of the negative side semiconductor modules has an electrode terminal connected to the busbar 3n. The positive side and negative side semiconductor modules of the power inverter are connected in series. The junction between them is connected to one of the power supply terminals (U, V, W) of the load (3-phase AC motor). Referring to FIG. 2, as shown the electric power converter apparatus 1 is provided with a cooling apparatus 4, having cooling tubes 41 which are disposed at positions successively alternating with the 15 stages of the electric power converter apparatus 1. That is, respective cooling tubes 41 are alternately stacked with the 15 stages, forming an elongated array. The cooling tubes 41 are thereby disposed in contact with opposing sides of each of the semiconductor modules 2, other than those of the two outermost stages, each of which is contacted on a single side by one of the cooling tubes 41.

As shown in FIG. 2, each of the cooling tubes 41 has one end (with respect to the elongation direction of the cooling tube) connected to an intake manifold 42, and the other end connected to an outlet manifold 43, i.e., the intake manifold 42 and outlet manifold 43 extend along respectively opposing sides of the array of alternately stacked semiconductor module stages and cooling tubes 41. The intake manifold 42 is connected to an intake port 431 and the outlet manifold 43 is connected to a discharge port 432. A coolant medium W is impelled to flow through the intake port 431 into the intake manifold 42, through each of the cooling tubes 41, and then passes via the outlet manifold 43 to exit through the discharge port 432, as indicated by the arrows in FIG. 2.

The coolant medium W can for example consist of a natural coolant medium such as water or ammonia, etc., or water mixed with an antifreeze agent such as ethylene glycol, or a fluorocarbon type of coolant medium such as fluorinat, etc, or a freon type of coolant medium such as HCFC123, HCFC134a, etc, or an alcohol type of coolant medium such as methanol or ethanol, or a ketone type of coolant medium such as acetone, etc.

The stages which constitute the voltage step-up converter (i.e., the module pairs 207A and 207B, 208A and 208B, 209A and 209B) are disposed as the $7^{th}$, $8^{th}$ and $9^{th}$-stages, located at successively increasing distances from the intake port 431.

The closer a module is to the intake port 431, the lower will be the thermal resistance (as defined hereinabove) of the module. This is due to the fact that the flow rate and the temperature of the coolant medium decreases, and the pressure loss within the coolant medium increases, in accordance with increasing distance from the intake port 431.

The connection conditions between the intermediate busbar 3c and the semiconductor modules of the $7^{th}$, $8^{th}$ and $9^{th}$ stages are illustrated in FIG. 1. Each of these stages has four electrode terminals 21a, 21b, 21c and 21d as shown. Numeral 31 denotes a common branch point, which is common to respective connection paths between the intermediate busbar 3c and the $7^{th}$ stage semiconductor module pair 207A, 207B, the $8^{th}$ stage semiconductor module pair 208A, 208B, and the $9^{th}$ stage semiconductor module pair 209A, 209B. A branch conductor lead 32e connects the electrode terminal 21b of the semiconductor module 207A to the common branch point 31. A branch conductor lead 32f connects the electrode terminal 21b of the semiconductor module 208A to the common branch point 31. As shown, the branch conductor lead 32f is longer than the branch conductor lead 32e, by the distance between the common branch point 31 and a branch point 311. With this embodiment, the conductor portion between these points 31 and 311 is an extension of the intermediate busbar 3c.

Similarly, a branch conductor lead 32g connects the electrode terminal 21b of the semiconductor module 209A to the common branch point 31. As shown, the branch conductor lead 32g is longer than the branch conductor lead 32f, by the distance between the branch point 311 and a junction point 312. With this embodiment, the conductor portion between the points 31 and 312 is an extension of the intermediate busbar 3c.

It can thus be understood that the parallel-connected positive-polarity semiconductor modules 207A, 208A and 209A are connected to the intermediate busbar 3c by paths which are of respectively increased length, and thereby are of respectively increased impedance it can further be understood from FIG. 1 that this is also true for the parallel-connected negative-polarity semiconductor modules 207B, 208B and 209B. The semiconductor module 207B has an electrode terminal 21d which is connected to an extension of the aforementioned branch conductor lead 32e, while the semiconductor module 208B similarly has an electrode terminal 21d which is connected to an extension of the branch conductor lead 32f, and the semiconductor module 209B has an electrode terminal 21d which is connected to an extension of the branch conductor lead 32g. In addition, the branch conductor leads 32e and 32f are connected, at an intermediate position of each, by a conductor portion 33e, and the branch conductor leads 32f and 32G are connected, at an intermediate position of each, by a conductor portion 33f. It can thus be understood that parts of the branch conductor leads 32e, 32f and 32g serve in common for more than one of the semiconductor modules of the $7^{th}$, $8^{th}$ and $9^{th}$ stages. This is also true for the part of the intermediate busbar 3c which extends between the branch points 31 and 311, and which is common to both the $8^{th}$ stage and $9^{th}$ stage semiconductor modules.

It can further be understood that all currents which flow through the electrode terminals 21b and 21d of the semiconductor modules of the $7^{th}$, $8^{th}$ and $9^{th}$ stages pass through the common branch point 31.

The various branch conductor leads of the semiconductor modules 2 are collectively designated by numeral 32 in the following.

FIG. 4 illustrates the structure of the connections between the busbars 3c, 3n, 3p and the $7^{th}$, $8^{th}$ and $9^{th}$ stage semiconductor modules. The connection conditions between the busbars 3p, 3n and the semiconductor modules of the $7^{th}$, $8^{th}$ and $9^{th}$ stages are illustrated in FIG. 5.

Figure 5:
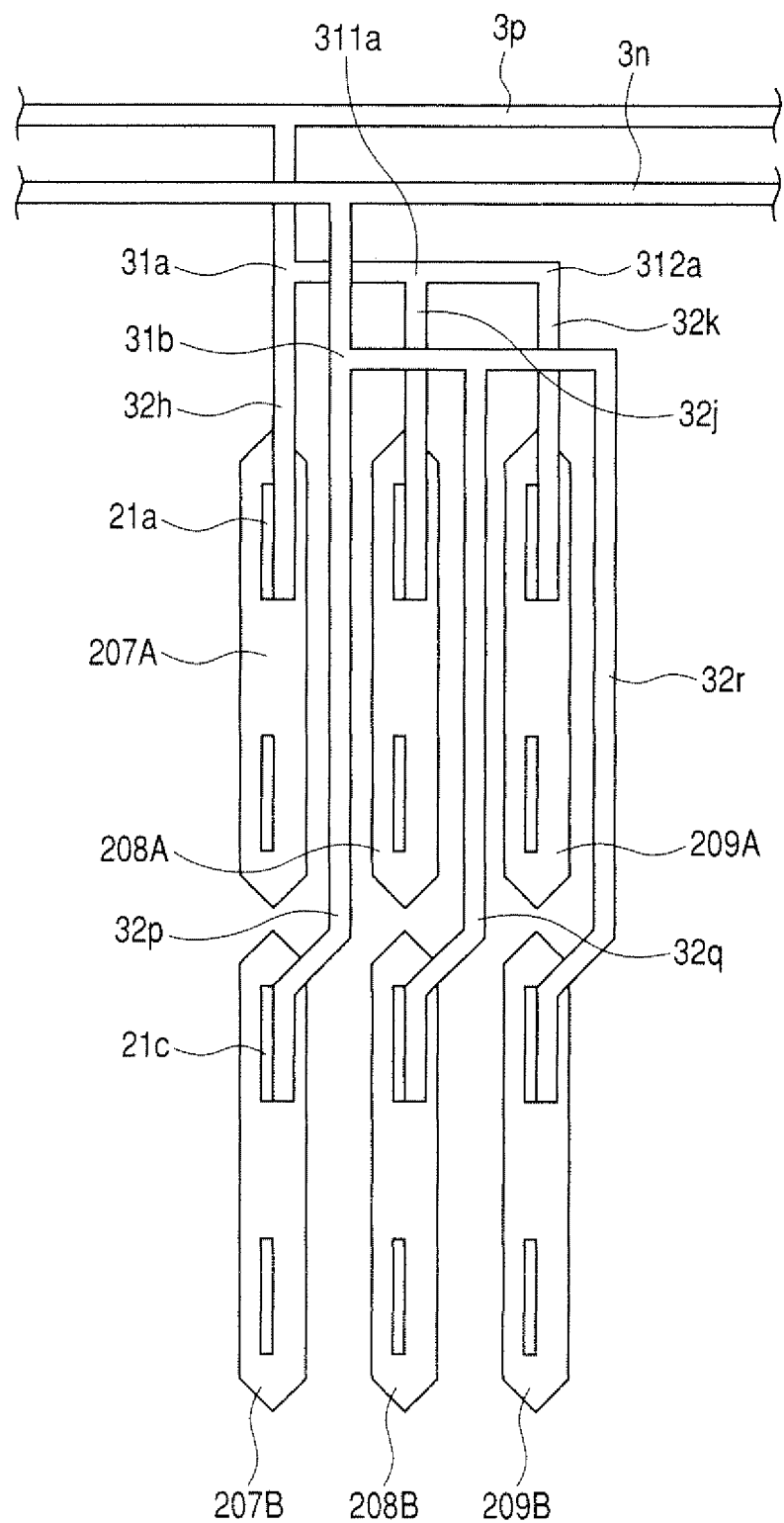
FIG. 5 is diagram for describing the connection conditions, within a part of the first embodiment, between the positive-polarity busbar, the negative-polarity busbar, and semiconductor modules.

In FIG. 5, numeral 31a denotes a common branch point which is common to connection paths between the busbar 3p and an electrode terminal 21a of the $7^{th}$ stage semiconductor module 207A (i.e. a path via a branch conductor lead 32h), an electrode terminal 21a of the $8^{th}$ stage semiconductor module 208A (via a branch conductor lead 32j), and an electrode terminal 21a of the $9^{th}$ stage semiconductor module 209A (via a branch conductor lead 32k). Numeral 31b denotes a common branch point which is common to connection paths between the busbar 3n and an electrode terminal 21c of the $7^{th}$ stage semiconductor module 207B (via a branch conductor lead 32p), an electrode terminal 21c of the $8^{th}$ stage semiconductor module 208B (via a branch conductor lead 32q), and an electrode terminal 21c of the $9^{th}$ stage semiconductor module 209B (via a branch conductor lead 32r).

Hence, in the same manner as for the connections to the electrode terminals 21b of the semiconductor modules 207A, 208A, 209A described above, it is ensured that ensured that there are successively increasing values of path length (as measured from the common branch point 31a, which is connected to the busbar 3p), and thus successively increasing values of impedance, between the common branch point 31a and respective electrode terminals 21a of the $7^{th}$, $8^{th}$ and $9^{th}$ stage semiconductor modules 207A, 208A and 209A. Similarly, it is ensured that ensured that there are successively increasing values of path length (as measured from a common branch point 31b, which is connected to the busbar 3n ), and thus successively increasing values of impedance, between the common branch point 31b and respective electrode terminals 21c of the $7^{th}$, $8^{th}$ and $9^{th}$ stage semiconductor modules 207B, 208B and 209B.

Effects of Embodiment

For the reasons described hereinabove, the semiconductor modules of the $7^{th}$, $8^{th}$ and $9^{th}$ stages of the electric power converter apparatus 1 have successively increased values of thermal resistance. With this embodiment, the higher the thermal resistance of a semiconductor module which is part of a plurality of semiconductor modules connected in parallel, the greater is made the impedance of each connection path to the semiconductor module (i.e., each connection path which transfers a flow of current through the semiconductor module). As a result, the lower the effectiveness of cooling of a semiconductor module, the lower is made the level of current which flows in the module, thereby reducing the relative amount of heat generated within the module.

The embodiment has been described above referring to the semiconductor modules (modules of the $7^{th}$, 8 and $9^{th}$ stages) which constitute the voltage step-up converter of the electric power converter apparatus 1. However it is similarly ensured that, for each parallel-connected plurality of semiconductor modules of the remaining stages of the electric power converter apparatus 1, the higher the thermal resistance of a semiconductor module, the greater is made the impedance of a connection path between that semiconductor module and a branch point which is common to the other ones of that plurality of parallel-connected semiconductor modules.

Temperature variations between parallel-connected semiconductor modules can thereby be reduced, and adverse effects of excessively high temperature upon the electrical characteristics of semiconductor modules can thereby be reduced.

With the above embodiment, respectively different values of impedance of the connection paths to the semiconductor modules are achieved by providing different lengths of branch conductor leads 32 between electrode terminals of respective parallel-connected semiconductor modules and a branch point which is common to these semiconductor modules.

It can thereby be ensured that significant variations in temperature will not occur between semiconductor modules which are located close to the upstream side of the flow of coolant medium of the cooling tubes 41 (i.e., modules located close to the intake aperture 431 of the intake manifold 42 shown in FIG. 2) and so have a relatively low thermal resistance, and semiconductor modules which are located downstream with respect to the flow path of the coolant medium, and so have a relatively high thermal resistance.

Due to the structure of the electric power converter apparatus 1 whereby the cooling tubes 41 and the semiconductor modules 2 are alternately stacked, the electric power converter apparatus 1 can be made of compact size.

With the above embodiment, different lengths of connection path are established to respective parallel-connected semiconductor modules from each of the intermediate busbar 3c, the positive-polarity busbar 3p, and the negative-polarity busbar 3n. However it should be noted that it would be equally possible to establish different lengths of connection path only between one of the busbars 3c, 3p and 3n and respective semiconductor modules, or only between part of the busbars and respective semiconductor modules.

Second Embodiment

A second embodiment will be described, referring to FIG. 6. As can be understood from comparison with FIG. 1 of the first embodiment, the second embodiment differs from the first embodiment in that, with the second embodiment, different values of path impedance are established between a busbar and respective semiconductor modules not only by establishing respectively different path lengths (different lengths of branch conductor lead), but also by establishing respectively different values of cross-sectional area of a conductor which constitutes at least a part of a branch conductor lead.

Figure 6:
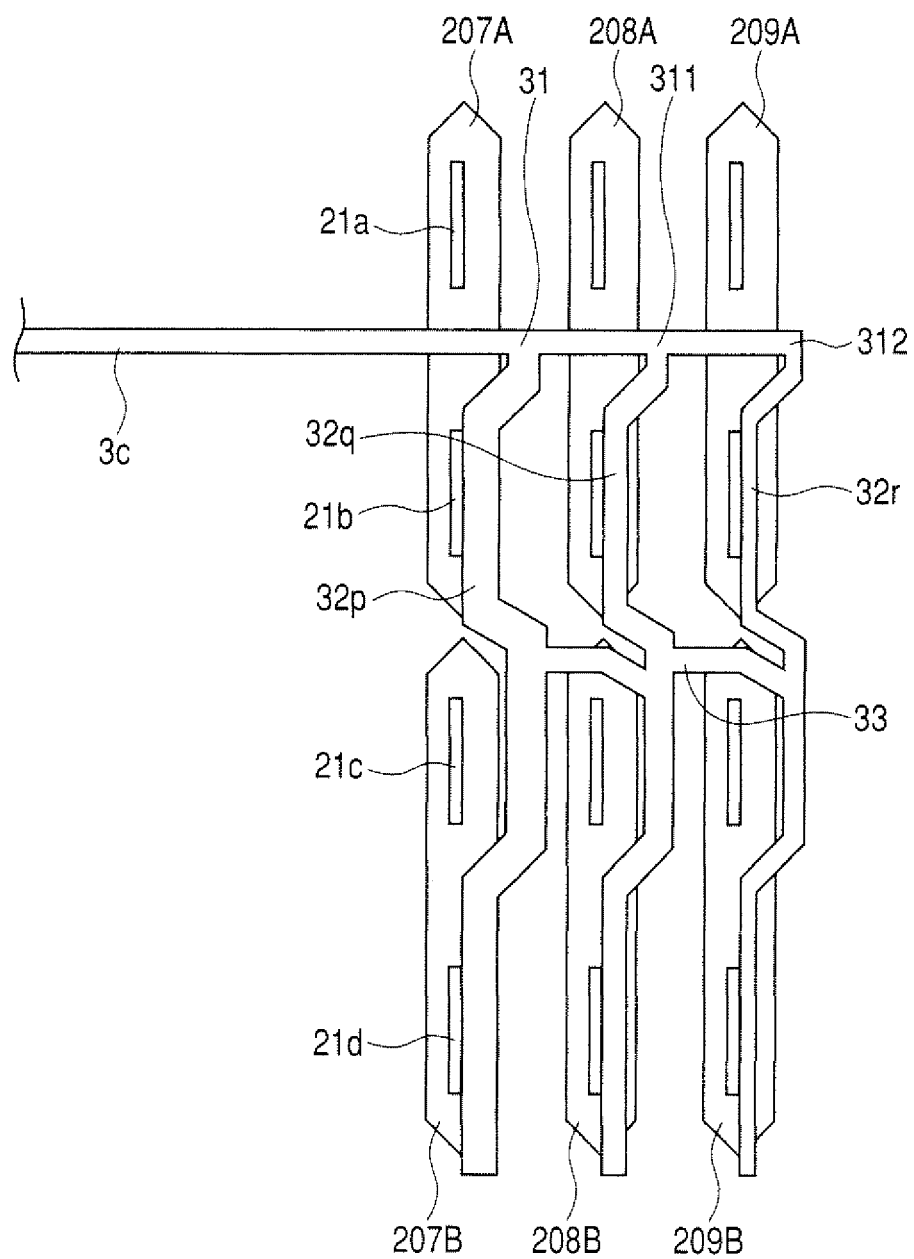
FIG. 6 is a diagram for describing the connection conditions between an intermediate busbar and semiconductor modules, within a part of a second embodiment of an electric power converter apparatus.

Specifically as shown in FIG. 6, the cross-sectional area of a part of the branch conductor lead 32q in the path between the busbar 3c and the electrode terminals 21b, 21d of the $8^{th}$ stage semiconductor module pair 208A, 208B is made smaller than the cross-sectional area of the corresponding part of the branch conductor lead 32p in the path between the busbar 3c and the electrode terminals 21b, 21d of the $7^{th}$ stage semiconductor module pair 207A, 207B. A similar difference is made between the respective cross-sectional areas of the aforementioned part of the branch conductor lead 32q and the corresponding part of the branch conductor lead 32r of the $8^{th}$ stage semiconductor module pair 209A, 209B. Successively increasing values of impedance are thereby established for the paths between the $7^{th}$ stage, $8^{th}$ stage and $9^{th}$ stage semiconductor module pairs, in accordance with their respectively increased values of thermal resistance.

Similar differences are made in the cross-sectional area of at least a specific part of each of the branch conductor leads which connect between the busbar 3p and the $7^{th}$ stage, $8^{th}$ stage and $9^{th}$ stage semiconductor module pairs (as described above referring to FIG. 5 for the first embodiment), and of the branch conductor leads which respectively connect between the busbar 3n and the $7^{th}$ stage, $8^{th}$ stage and $9^{th}$ stage semiconductor module pairs 207A and 207B, 208A and 208B, 209A and 209B.

However it would be equally possible to establish different cross-sectional areas of at least a part of only the branch conductor leads in the connection paths between one of the busbars 3c, 3p and 3n and respective semiconductor modules, or only the branch conductor leads in the connection paths between part of the busbars and respective semiconductor modules.

In other respects, this embodiment is similar to the first embodiment, and provides similar effects.

Third Embodiment

A third embodiment will be described, which has a similar configuration to the first embodiment described above based on FIGS. 1 to 5. The third embodiment differs from the first embodiment in that, referring to FIG. 1, the to electrical resistivity of the material constituting a part of the branch conductor lead 32f (i.e., which joins the intermediate busbar 3c at the branch point 311) in the path between the busbar 3c and the electrode terminals 21b, 21d of the $8^{th}$ stage semiconductor module pair 208A, 208B is made greater than the resistivity of the corresponding part of the branch conductor lead 32e (i.e., is which joins the intermediate busbar 3c at the branch point 31) in the path between the busbar 3c and the electrode terminals 21b, 21d of the $7^{th}$ stage semiconductor module pair 207A, 207B. A similar difference is made between the resistivities of the material constituting the aforementioned part of the branch conductor lead 32f and the corresponding part of the branch conductor lead 32g of the $8^{th}$ stage semiconductor module pair 209A, 209B. Successively increasing values of impedance are thereby established for the paths between the $7^{th}$ stage, $8^{th}$ stage and $9^{th}$ stage semiconductor module pairs, in accordance with their respectively increased values of thermal resistance. Similar differences are made in the resistivities of the materials of parts of the branch conductor leads which respectively connect between the busbars 3p and 3n and the $7^{th}$ stage, $8^{th}$ stage and $9^{th}$ stage semiconductor module pairs (as described above referring to FIG. 5 for the first embodiment). In other respects, this embodiment is similar to the first embodiment, and provides similar effects.

Specifically, the branch conductor lead 32e of the $7^{th}$ stage semiconductor modules 207A, 207B may be formed of C16200 wire, the branch conductor lead 32f of the 8th stage semiconductor modules 208A, 208B may be formed of red brass C2200, and the branch conductor lead 32g of the 9th stage semiconductor modules 209A, 209B may be formed of 7/3 brass. The electrical resistivity of C16200 wire is 1.92 $\mu\Omega\cdot cm$, the electrical resistivity of red brass C2200 is 3.9 $\mu\Omega\cdot cm$, and the electrical resistivity of 7/3 brass is 6.2 $\mu\Omega\cdot cm$.

However it would be equally possible to utilize other materials for establishing respectively different values of resistance, such as expanded ASTM-C14500 (having resistivity of 1.86 $\mu\Omega\cdot cm$), or phosphorous bronze (having resistivity of 8.7 $\mu\Omega\cdot cm$).

Fourth Embodiment

A fourth embodiment will be described, having a similar configuration to the first embodiment above. Referring to FIG. 2, each of the two cooling tubes is 41 which are respectively located at the outer (opposite) ends of the electric power converter apparatus 1 is in contact with only a single pair of semiconductor modules, i.e., the $15^{th}$ stage semiconductor modules 215A, 215B or the 1st stage semiconductor modules 201A 201B. With the fourth embodiment, the impedances of the branch conductor leads of the 1st stage semiconductor module pair 201A, 201B are made lower than the impedances of the corresponding branch conductor leads of adjacent semiconductor modules which are connected in parallel with the modules 201A, 201B. That is, assuming the semiconductor modules 201A, 201B are respectively connected in parallel with the semiconductor modules 202A, 202B, branch conductor leads which connect the semiconductor modules 201A, 201B (located closest to the intake port 431) to the busbars 3p and 3n are made lower in impedance than those of the corresponding branch conductor leads of the semiconductor modules 202A, 202B. Similarly, assuming that the semiconductor modules 215A, 215B (located farthest from the intake port 431) are respectively connected in parallel with the semiconductor modules 214A, 214B, the branch conductor leads which connect the semiconductor modules 215A, 215B to the busbars 3p and 3n are made lower in impedance than the corresponding branch conductor leads of the semiconductor modules 214A, 214B.

These differences in impedance can be implemented by any of the methods described above for the first, second and third embodiments. In other respects, this embodiment is similar to the first embodiment.

This embodiment enables temperature variation (temperature bias) between semiconductor modules that are connected in parallel to be further reduced. The reasons are as follows. Only one face of each of the outermost pair of cooling tubes 41 is in contact with semiconductor modules (i.e., with the modules 201A, 201B or 215A, 215B). As a result, the extent of temperature increase in the coolant medium as it flows through each cooling tube is less, in the case of an outermost one of the cooling tubes 41 than for the other cooling tubes 41, each of which is in contact with semiconductor modules on two opposing faces. Hence with the preceding embodiments, the temperature of the 1st stage semiconductor modules 201A, 201B will become lower than that of the 2nd stage semiconductor modules 202A, 202B for example. Similarly, the temperature of the $15^{th}$ stage semiconductor modules 215A, 215B will become lower than that of the 14th stage semiconductor modules 214A, 214B.

However, by providing appropriate relationships of impedances of branch conductor leads 32 with the fourth embodiment as described above, this cause of temperature variations between parallel-connected semiconductor modules can be eliminated, by appropriately relatively increasing the amount of power dissipated within the outermost semiconductor modules (201A, 201B and 215A, 215B), through a relative decrease in the impedances of the branch conductor leads of these outermost semiconductor modules.

Comparison Example

Figure 7:
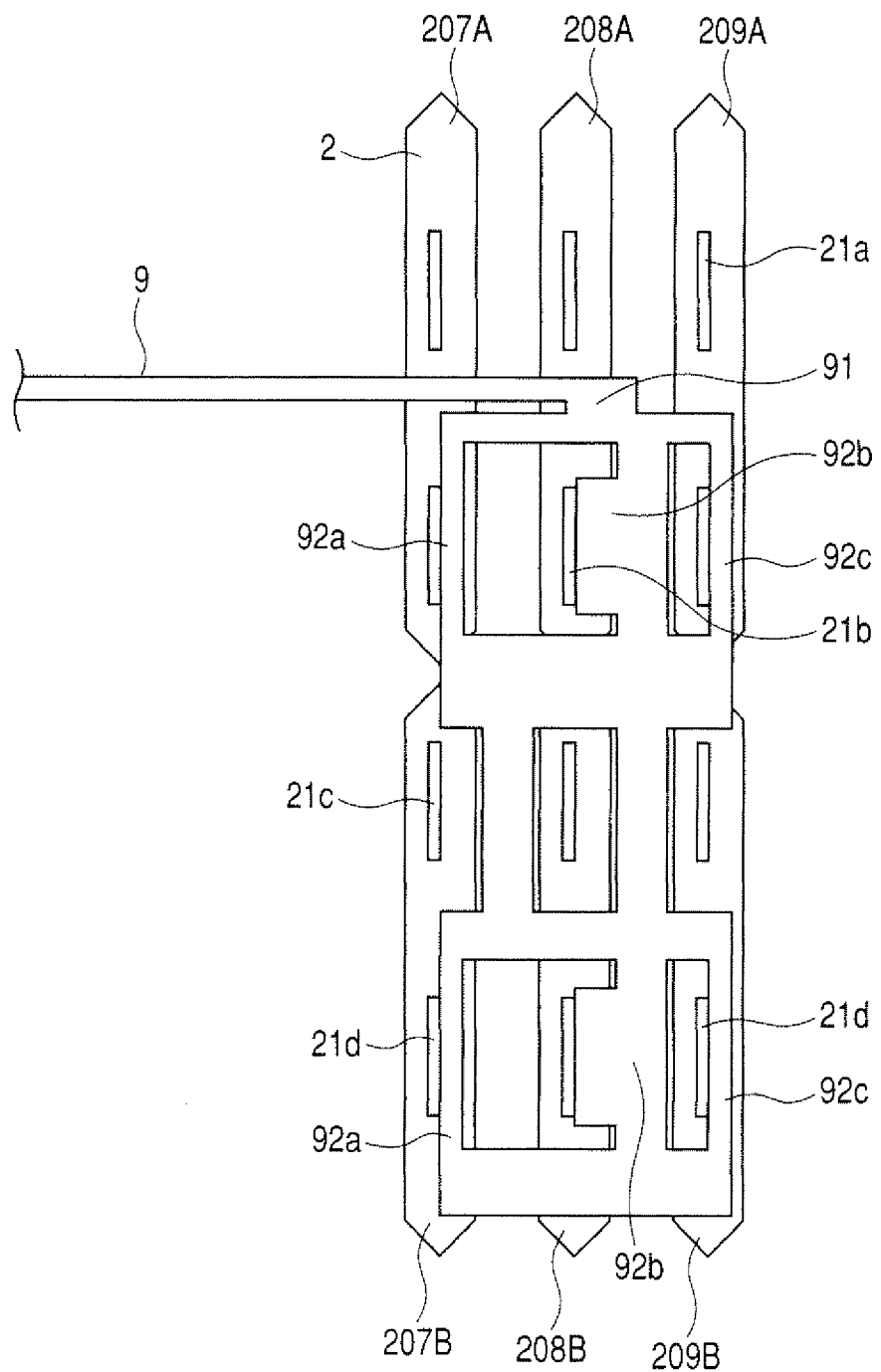
FIG. 7 is a diagram showing an example of connection conditions based on prior art, between an intermediate busbar and semiconductor modules, within a comparison example of an electric power converter apparatus.

For the purposes of comparison, an example of an electric power converter apparatus was constructed, having a similar structure to that of FIG. 2, but with the connection paths between the busbars configured to provide substantially identical levels of current flow through each of the semiconductor modules. To achieve this, in the case of the connections between a busbar 9 (corresponding to the busbar 3c of the first embodiment) and the $7^{th}$ stage, $8^{th}$ stage and $9^{th}$ stage semiconductor modules (207A and 207B, 208A and 208B, 209A and 209B) constituting the voltage step-up converter, the configuration shown in FIG. 7 was utilized.

With this configuration, the lengths of the branch conductor leads 92a and 92c between a common branch point 91 of the busbar 9 and the electrode terminals 21b of the semiconductor modules 207A and 209A are substantially identical, while the length of the branch conductor lead 92b from the common branch point 91 to the electrode terminal 21b of the semiconductor module 208A is slightly shorter than for the modules 207A, 209B. As can be understood from FIG. 7, there is a similar relationship between the path lengths in the case of the respective electrode terminals 21d of the semiconductor modules 207B, 208B and 209B. The connection paths to the other busbars 3p, 3n and the electrode terminals 21a, 21c of each of the $7^{th}$ stage, $8^{th}$ stage and $9^{th}$ stage semiconductor modules were similarly configured to provide substantially identical levels of current flow through the semiconductor modules.

As a result, since the $9^{th}$ stage semiconductor modules 209A, 209B have a higher thermal resistance than the $7^{th}$ stage semiconductor modules 207A, 207B for the reasons described hereinabove, the $9^{th}$ stage semiconductor modules 209A, 209B will operate at a significantly higher temperature than the $7^{th}$ stage semiconductor modules 207A, 207B, since similar levels of current will flow through the semiconductor modules of these stages. Similarly, the temperature of the $8^{th}$ stage semiconductor modules 208A, 208B will be significantly increased by comparison with the $7^{th}$ stage semiconductor modules 207A, 207B.

Figure 8:
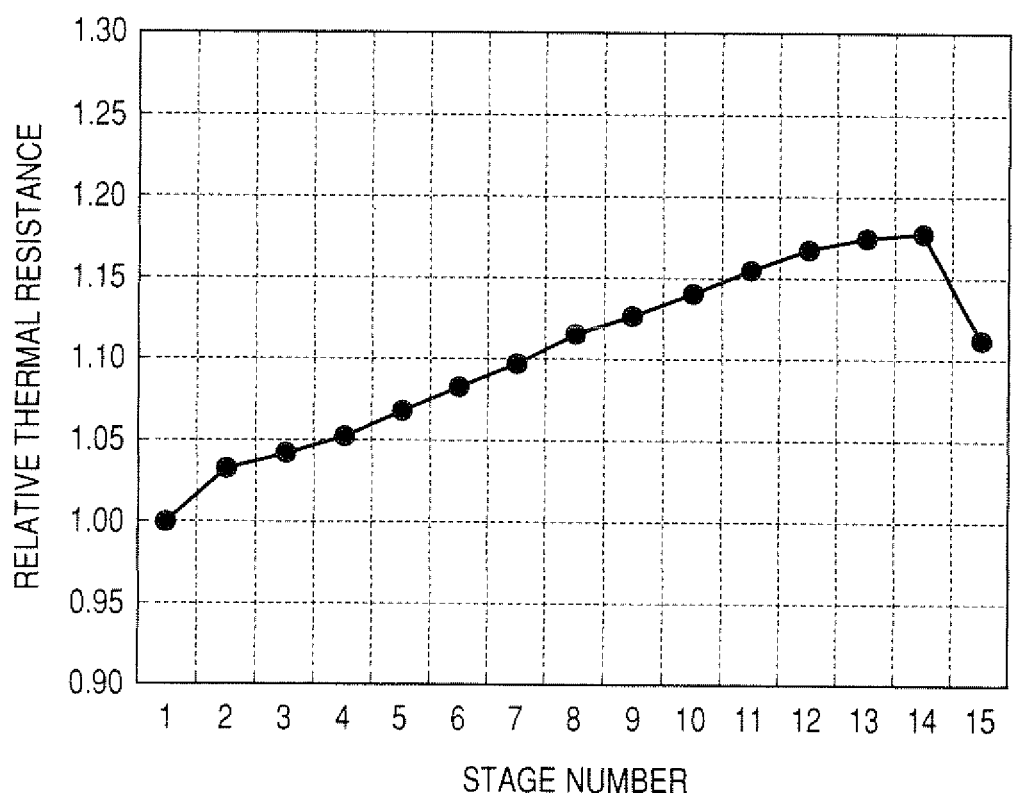
FIG. 8 is a graph illustrating a relationship between respective values of thermal resistance of semiconductor modules and stage positions of the semiconductor modules, for the comparison example of FIG. 7.

FIG. 8 is a graph showing the results of measuring the respective values of thermal resistance of the negative side semiconductor modules 201B to 215B, i.e., the semiconductor modules which are closest to the intake port 431, for this comparison example. As shown, these values successively increase in accordance with the respective distances of the semiconductor modules from the intake port 431.

However the graph also shows that the thermal resistance of the $15^{th}$ stage semiconductor module (215B) is lower than that of the $14^{th}$ stage semiconductor module (214B). The graph also shows that the thermal resistance of the 1st stage semiconductor module (201B) is substantially lower than that of the 2nd stage semiconductor module (202B). The reason for this has been described hereinabove, i.e., resulting from the fact that each of the outermost pair of cooling tubes 41 has only one face that is in contact with semiconductor modules. Hence, there is a relatively smaller increase in the temperature of the coolant medium which flows through the outermost pair of cooling tubes 41.

The present invention has been described hereinabove for application to a plurality of parallel-connected semiconductor modules cooled by a coolant medium (coolant fluid) which is passed through cooling tubes which are in contact with the semiconductor modules. However it will be understood that the principles of the invention are equally applicable to various other arrangements for cooling a plurality of parallel-connected semiconductor modules, where temperature differences between the semiconductor modules arise due to different degrees of effectiveness of cooling respective modules.

What is claimed is:

1. An electrical power converter apparatus comprising:
a plurality of semiconductor modules connected in parallel with one another,
a plurality of branch conductors having a branch connection point in common, each of said branch conductors extending between said branch connection point and an electrode terminal of a corresponding one of said plurality of semiconductor modules, each of said semiconductor modules having a known corresponding value of thermal resistance; and
a cooling apparatus for cooling opposing sides of each of said semiconductor modules; wherein:
each of said branch conductors is configured with a specific value of impedance, and wherein said specific value of impedance is increased in accordance with increase of said value of thermal resistance of said corresponding semiconductor module;
cooling tubes of said cooling apparatus are alternately stacked with said semiconductor modules; and
said plurality of semiconductor modules are stacked as an elongated array, said array extending between a first end and a second end thereof, and wherein a branch conductor connected to a semiconductor modules located at a predetermined one of said first end and said second end is configured to have a lower value of impedance than each of respective branch conductors connected to semiconductor modules located at positions other than said predetermined one of the first end and second end of said elongated array.

2. An electric power converter apparatus as claimed in claim 1, wherein for each of said branch conductors, a length of said branch conductor is increased in accordance with increase of said value of thermal resistance of said corresponding semiconductor module.

3. An electric power converter apparatus as claimed in claim 1, wherein for each of said branch conductors, a cross-sectional area of said branch conductor is decreased in accordance with increase of said value of thermal resistance of said corresponding semiconductor module.

4. An electric power converter apparatus as claimed in claim 1, wherein for each of said branch conductors, a value of electrical resistivity of a material constituting said branch conductor is increased in accordance with increase of said value of thermal resistance of said corresponding semiconductor module.

* * * * *